US008586894B2

(12) United States Patent
Igura

(10) Patent No.: US 8,586,894 B2
(45) Date of Patent: Nov. 19, 2013

(54) VEHICLE WINDOW PANEL

(75) Inventor: Tsuyoshi Igura, Hiroshima (JP)

(73) Assignee: DaikyoNishikawa Corporation, Hiroshima (JP)

( * ) Notice: Subject to any disclaimer, the term of this patent is extended or adjusted under 35 U.S.C. 154(b) by 368 days.

(21) Appl. No.: 12/750,603

(22) Filed: Mar. 30, 2010

(65) Prior Publication Data

US 2010/0243632 A1 Sep. 30, 2010

(30) Foreign Application Priority Data

Mar. 30, 2009 (JP) ................................. 2009-082772

(51) Int. Cl.
*B60L 1/02* (2006.01)

(52) U.S. Cl.
USPC ............................ 219/203; 219/202; 343/713

(58) Field of Classification Search
USPC .................. 219/203, 202; 343/712, 704, 713; 524/265
See application file for complete search history.

(56) References Cited

U.S. PATENT DOCUMENTS

| | | | | |
|---|---|---|---|---|
| 4,260,989 | A * | 4/1981 | Ishii et al. | 343/704 |
| 4,803,492 | A * | 2/1989 | Inaba et al. | 343/713 |
| 5,332,412 | A * | 7/1994 | Manabe et al. | 65/60.2 |
| 5,434,384 | A * | 7/1995 | Koontz | 219/203 |
| 6,024,904 | A | 2/2000 | Nanri | |
| 8,111,202 | B2 * | 2/2012 | Kagaya et al. | 343/713 |
| 2001/0009408 | A1 * | 7/2001 | Nagayama et al. | 343/712 |
| 2001/0036986 | A1 * | 11/2001 | Matsumura et al. | 524/265 |
| 2007/0080876 | A1 * | 4/2007 | Kagaya et al. | 343/713 |
| 2007/0247379 | A1 * | 10/2007 | Oshima et al. | 343/713 |
| 2007/0273597 | A1 * | 11/2007 | Noda | 343/713 |
| 2008/0203078 | A1 * | 8/2008 | Huerter | 219/203 |
| 2009/0096690 | A1 * | 4/2009 | Shimo et al. | 343/713 |

FOREIGN PATENT DOCUMENTS

| | | | |
|---|---|---|---|
| JP | 8-99610 | A | 4/1996 |
| JP | 11-245772 | A | 9/1999 |
| JP | 2002-160519 | A | 6/2002 |
| JP | 2003-338218 | A | 11/2003 |
| JP | 2007-237807 | A | 9/2007 |

* cited by examiner

*Primary Examiner* — Eugene Lee
*Assistant Examiner* — Fang-Xing Jiang
(74) *Attorney, Agent, or Firm* — Nixon Peabody LLP; Joseph Bach, Esq.

(57) ABSTRACT

A vehicle window panel includes a panel body having a plate shape and made of a resin material. The panel body integrally includes a window portion permitting light to pass therethrough. A conductive layer strip is formed on an interior surface of the window portion by applying a paste containing silver powder, as a main component, and thermosetting resin, as a binder, onto the interior surface. The layer strip has a width ranging from 0.05 mm to 0.1 mm, both inclusive.

6 Claims, 2 Drawing Sheets

VEHICLE WINDOW PANEL

CROSS-REFERENCE TO RELATED APPLICATION

This application claims priority to Japanese Patent Application No. 2009-082772 filed on Mar. 30, 2009, the disclosure of which including the specification, the drawings, and the claims is hereby incorporated by reference in its entirety.

BACKGROUND

The present disclosure relates to vehicle window panels which are attached to windows formed in vehicles and cover openings of the windows.

Japanese Patent Publication No. 2003-338218 describes a technique of forming a conductive layer strip by baking, on window glass, a paste mainly containing silver powder.

Japanese Patent Publication No. 2002-160519 describes a technique of employing a window panel made of a resin member, instead of inorganic glass, in order to reduce the vehicle weight and forming a conductive layer strip by printing a resin paste containing silver powder on the window panel.

SUMMARY

In Japanese Patent Publication No. 2003-338218, metal such as V, Mn, Fe, or Co and its oxide are added to the above-mentioned paste in order to darken the conductive layer strip and, thereby concealing the layer strip from outside the vehicle.

However, in the case of employing a resin window panel as described in Japanese Patent Publication No. 2002-160519, since a paste containing metal and its oxide needs to be applied with a technique such as printing at a high temperature of 300° C. to 800° C. in order to form a layer strip, the surface of a window panel made of thermoplastic resin, such as acrylic resin or polycarbonate resin, having a lower softening temperature than that of inorganic glass, melts at such a high temperature, and the paste cannot be applied. Accordingly, no layer strips can be formed on the window panel. As a result, darkening measures as described in Japanese Patent Publication No. 2003-338218 cannot be used for a resin window panel, and the layer strip is visible from outside the vehicle, thereby degrading the appearance of the window panel.

It is therefore an object of the present invention to provide a vehicle window panel including a resin panel body on which a conductive layer strip is inconspicuous in order to enhance the appearance of a vehicle.

To achieve the object, a feature of the present disclosure is a narrow width of a layer strip enough to make the layer strip inconspicuous.

Specifically, the present disclosure is directed to a vehicle window panel configured to be attached to a window formed in a vehicle to close an opening of the window. The window panel includes: a panel body having a plate shape, made of a resin material, and integrally including a window portion permitting light to pass therethrough; and at least one conductive layer strip formed, on a surface of the window portion facing an interior of the vehicle, by applying a paste containing silver powder, as a main component, and thermosetting resin, as a binder, onto the surface of the window portion facing the interior of the vehicle. The layer strip has a width ranging from 0.05 mm to 0.1 mm, both inclusive.

DETAILED DESCRIPTION

An embodiment of the present disclosure will be described hereinafter with reference to the drawings.

Figure 1:
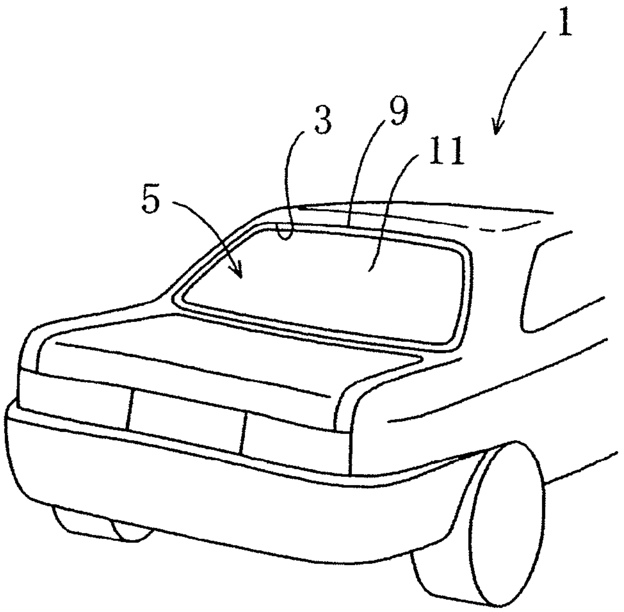
FIG. 1 is a perspective view illustrating a rear portion of a vehicle to which a vehicle window panel according to an embodiment is attached.

FIG. 1 shows a rear portion of a vehicle 1. As illustrated in FIG. 1, an approximately rectangular window opening 3 is formed in the rear portion of the vehicle 1, and an approximately rectangular vehicle window panel 5 in the shape of a plate is attached to the window associated with the opening 3 to cover the opening 3.

Figure 2:
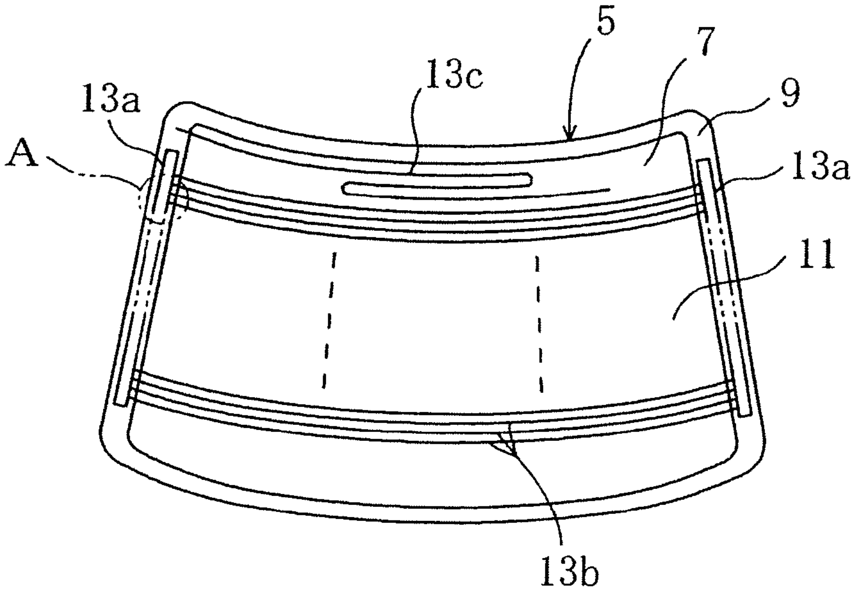
FIG. 2 is a view illustrating the window panel of FIG. 1 when viewed from the vehicle interior.

FIG. 2 illustrates a window panel 5 when viewed from the vehicle interior. The window panel 5 has an approximately rectangular plate-shaped panel body 7 which is made of thermoplastic resin such as acrylic resin, polycarbonate, or polyallylate, and permits light to pass therethrough. An opaque coating, e.g., a black coating, is applied onto the outer edge of the interior surface (i.e., the surface facing the vehicle interior) of the panel body 7 along the entire periphery of the panel body 7 in order to conceal an area surrounding the opening 3 of the window panel 5, i.e., an area surrounding an window portion 11, which will be described later, of the window panel 5, from outside the vehicle, thereby forming a concealing layer 9. An inner portion of the panel body 7 surrounded by the concealing layer 9 integrally includes the window portion 11 having the property of permitting light to pass therethrough.

Figure 3:
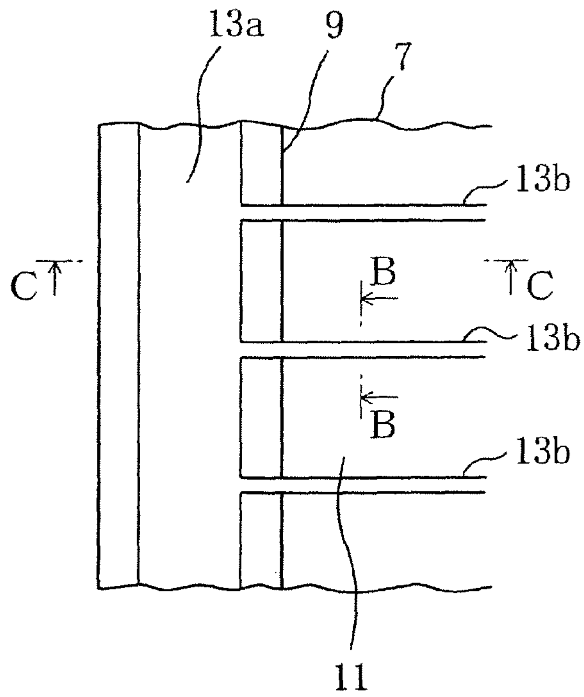
FIG. 3 is an enlarged view illustrating an area A in FIG. 2.
Figure 4A:
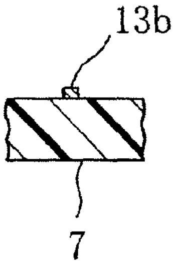
FIG. 4A is a cross-sectional view of the window panel taken along line B-B in FIG. 3.
Figure 4B:
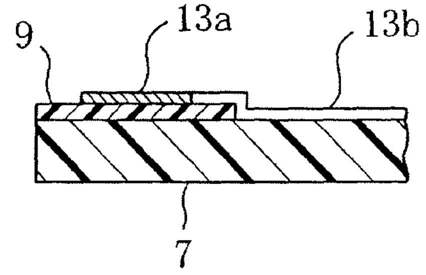
FIG. 4B is a cross-sectional view of the window panel taken along line C-C in FIG. 3.

A conductive layer strip 13*a* serving as a busbar is provided on each side, along the vehicle width, of the interior surface of the concealing layer 9, and extends vertically (i.e., along the vehicle height). As also illustrated in FIGS. 3 and 4, a plurality of approximately parallel conductive layer strips 13*b* are provided on the interior surface of the window portion 11, and extend horizontally (i.e., along the vehicle width), to be connected to the conductive layer strips 13*a* at both sides along the vehicle width. These layer strips 13*b* function as anti-fog/frost heating wires for defogging and defrosting. The conductive layer strips 13*a* and the layer strips 13*b* have laminated structures, and are formed at a time by applying a paste containing silver powder, as a main component, and thermosetting resin, as a binder, onto the interior surface of the window portion 11 with a technique such as printing. The paste to be applied contains 60% to 85%, by weight, of silver powder, 20% to 30%, by weight, of dipropylene glycol methyl ether, and 1% to 10%, by weight, of bisphenol A epoxy resin, as primary components. The application temperature of the paste is set in the range from 120° C. to 130° C.

The width of the layer strips 13*b* is set in the range from 0.05 mm to 0.1 mm, both inclusive, and the spacing between the layer strips 13*b* is set in the range from 2.0 mm to 5.0 mm, both inclusive. The thickness of the layer strips 13*b* is set in the range from 25 μm to 50 μm, both inclusive.

A single conductive layer strip 13*c* having the same width as that of the layer strips 13*b* is provided on the interior surface of the window portion 11 above the layer strips 13*b*, and forms a line which is folded two times in a middle portion, along the vehicle width, of the window portion 11 in such a manner that the folded portions are vertically separated from each other. When viewed from the inside of the vehicle, the left end of the layer strip 13*c* is connected to the left portion of the concealing layer 9, whereas the right end of the layer strip 13*c* is located around the middle of the window portion 11. The layer strip 13*c* serves as an antenna of, for example, a radio or a television set installed in the vehicle.

The reason for setting the width of the layer strips 13*b* and 13*c* in the range from 0.05 mm to 0.1 mm, both inclusive, is as follows. If the width is less than 0.05 mm, it is difficult to apply the paste or only a small amount of heat is generated from the layer strip 13*c*, resulting in that fogging or frosting on the window portion 11 cannot be sufficiently prevented (or removed). On the other hand, if the width exceeds 0.1 mm, the layer strips 13*b* and 13*c* become noticeable, resulting in degradation of the appearance of the window panel 5.

The reason for setting the spacing between the layer strips 13*b* in the range from 2.0 mm to 5.0 mm, both inclusive, is as follows. If the spacing is less than 2.0 mm, the layer strips 13*b* are excessively close to each other, thereby reducing visibility through the window portion 11. On the other hand, if the spacing exceeds 5.0 mm, sufficient defogging and defrosting cannot be achieved for the window portion 11.

The reason for setting the thickness of the layer strips 13*b* in the range from 25 μm to 50 μm, both inclusive, is as follows. If the thickness is less than 25 μm, conductivity cannot be ensured, resulting in that the layer strips 13*b* cannot sufficiently prevent fogging or frosting on the window panel 5. On the other hand, if the thickness exceeds 50 μm, the layer strips 13*b* might be peeled off.

Since the width of the layer strip 13*c* used as an antenna is set in the range from 0.05 mm to 0.1 mm, both inclusive, which is the same range as that of the layer strips 13*b* used as anti-fog/frost heating wires, radio waves are allowed to be received. Accordingly, the layer strip 13*c* can sufficiently function as an antenna. Further, the thickness, electric resistance, and length, for example, of the layer strip 13*c* may be arbitrarily set according to the type of the antenna. With the technique of the present disclosure, the antenna layer strip 13*c* is not easily seen from outside the vehicle, thereby providing a good appearance of the window panel 5.

As described above, the layer strips 13*b* and 13*c* and the conductive layer strips 13*a* have laminated structures obtained by applying, with a technique such as printing, a paste containing silver powder, as a main component, and thermosetting resin, as a binder, i.e., a paste not containing metals such as V, Mn, Fe, and Co and their oxides, unlike Japanese Patent Publication No. 2003-338218. Accordingly, lamination of these strips on inorganic glass does not need to be performed at a high temperature of 300° C. to 800° C., and the strips can be easily formed at a low temperature of 120° C. to 130° C. with high precision on the panel body 7 made of a thermoplastic resin material.

In addition, since the width of the layer strips 13*b* and 13*c* is set in the range from 0.05 mm to 0.1 mm, both inclusive, the layer strips 13*b* and 13*c* are not conspicuous, thereby improving the appearance of the window panel 5. Further, the layer strips 13*b* and 13*c* can be easily formed by application of the paste. Moreover, a sufficient amount of heat generated from layer strips 13*b* can sufficiently prevent fogging or frosting on the window portion 11. Furthermore, the layer strip 13*c* can receive radio waves, and thus can be used as an antenna.

Since the spacing between the layer strips 13*b* is set in the range from 2.0 mm to 5.0 mm, both inclusive, visibility does not greatly decrease, and the layer strips 13*b* are not conspicuous, thereby preventing degradation of the appearance of the window panel 5. Further, a sufficient amount of generated heat can sufficiently reduce fogging or frosting on the window portion 11.

Since the thickness of the layer strips 13*b* is set in the range from 25 μm to 50 μm, both inclusive, conductivity can be ensured, a sufficient amount of generated heat can sufficiently reduce fogging or frosting on the window portion 11, and the layer strips 13*b* are less likely to be peeled off.

In this embodiment, the window panel 5 is a vehicle window panel provided at the rear of the vehicle 1. However, the embodiment is also applicable to side windows or sunroofs made of the thermoplastic resin material described above.

In this embodiment, the window panel 5 is a vehicle window panel provided at the rear of the vehicle 1 of a sedan type. However, the present disclosure is also applicable to a trunk door for opening/closing the rear trunk of the vehicle 1. In this case, this trunk door is made of an inner panel and an outer panel, the window panel constitutes the outer panel made of the thermoplastic resin material described above, and a peripheral concealing layer is formed (as a coating) such that a window is formed around the center of the outer panel.

The present disclosure is useful for, for example, a vehicle window panel which is attached to a window formed in a vehicle and closes an opening of the window.

What is claimed is:

1. A vehicle window panel configured to be attached to a window formed in a vehicle to close an opening of the window, the window panel comprising:

a panel body having a plate shape, made of a resin material, and integrally including a window portion permitting light to pass therethrough; and a plurality of conductive layer strips located on a surface of the window portion facing an interior of the vehicle and made of a paste containing silver powder, as a main component, and thermosetting resin, as a binder, wherein each of the layer strips has a width ranging from 0.05 mm to 0.1 mm, both inclusive, the layer strips include layer strips functioning as a plurality of anti-fog/frost heating wires arranged to be spaced apart from one another and extending substantially horizontally, spacing between the layer strips functioning as the anti-fog/frost heating wires is in the range from 2.0 mm to 5.0 mm, both inclusive, and, each of the layer strips has a thickness ranging from 25 μm to 50 μm, both inclusive.

2. The vehicle window panel of claim 1, wherein the layer strips include a layer strip serving as an antenna.

3. The vehicle window panel of claim 1, wherein each side of the layer strips along an extension direction thereof is connected to a conductive layer strip provided on an interior surface of the panel body and extending vertically.

4. The vehicle window panel of claim 1, wherein the layer strips include layer strips functioning as a plurality of anti-fog/frost heating wires arranged to be spaced apart from one another along a vertical direction and extending substantially horizontally, and also include a layer strip functioning as an antenna provided above the layer strips functioning as anti-fog/frost heating wires.

5. A vehicle window panel configured to be attached to a window formed in a vehicle to close an opening of the window, the window panel comprising:

a panel body having a plate shape, made of a resin material having a lower softening temperature than that of inorganic glass, and integrally including a window portion permitting light to pass therethrough;

a plurality of conductive layer strips functioning as anti-fog/frost heating wires for defogging and defrosting located on a surface of the window portion facing an interior of the vehicle and made of a paste containing silver powder, as a main component, and thermosetting resin, as a binder, wherein each of the layer strips functioning as anti-fog/frost heating wires has a width ranging from 0.05 mm to 0.1 mm, both inclusive; and, a conductive layer strip serving as an antenna located on a surface of the window portion facing an interior of the vehicle and made of a paste containing silver powder, as a main component, and thermosetting resin, as a binder, wherein the layer strip serving as an antenna has a width ranging from 0.05 mm to 0.1 mm, both inclusive, and has a thickness ranging from 25 μm to 50 μm, both inclusive.

6. The vehicle window panel of claim 5, wherein the spacing between the layer strips functioning as anti-fog/frost heating wire is in the range from 2.0 mm to 5.0 mm, both inclusive.

* * * * *